(12) United States Patent
Yanagisawa et al.

(10) Patent No.: US 6,421,782 B1
(45) Date of Patent: Jul. 16, 2002

(54) EXPANSION UNIT FOR DIFFERENTIATING WAKE-UP PACKETS RECEIVED IN AN INFORMATION PROCESSING SYSTEM

(75) Inventors: Takashi Yanagisawa, Yokohama; Masahiko Nomura, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,140

(22) Filed: Aug. 28, 1998

(30) Foreign Application Priority Data

Sep. 4, 1997 (JP) .............................. 9-239977

(51) Int. Cl.[7] .............................. G06F 11/30; G06F 1/26
(52) U.S. Cl. ........................................ 713/201; 713/310
(58) Field of Search .................................. 713/200, 201, 713/310, 320, 321, 322, 323, 324, 330, 340; 709/227, 229; 710/2, 15, 17, 18, 19, 72, 73, 129, 130, 200

(56) References Cited

U.S. PATENT DOCUMENTS

| | | | |
|---|---|---|---|
| 5,404,544 A | * | 4/1995 | Crayford .................... 713/310 |
| 5,802,305 A | * | 9/1998 | McKaughan et al. ....... 709/227 |
| 5,826,015 A | * | 10/1998 | Schmidt ..................... 713/201 |
| 5,835,719 A | * | 11/1998 | Gibson et al. .............. 709/221 |
| 5,938,771 A | * | 8/1999 | Williams et al. ............ 713/310 |
| 6,047,378 A | * | 4/2000 | Garrett et al. .............. 713/300 |
| 6,049,885 A | * | 4/2000 | Gibson et al. .............. 713/324 |
| 6,098,100 A | * | 8/2000 | Wey et al. .................. 709/223 |
| 6,101,608 A | * | 8/2000 | Schmidt et al. ............. 713/202 |

OTHER PUBLICATIONS

"Wake up to Wake–on–LAN", 1996, http://www.networking.ibm.com/eji/ejiwake.html, pp. 1–10.*

* cited by examiner

Primary Examiner—Gail Hayes
Assistant Examiner—Christopher A. Revak
(74) Attorney, Agent, or Firm—Joscelyn G. Cockburn

(57) ABSTRACT

To provide an expansion unit that implements a WOL (Wake-On-LAN) security function at a low cost in a multi-user environment wherein one expansion unit is used in common by an unspecified number of notebook PCs. An expansion unit includes a LAN adapter having WOL function for connection to a LAN. Since power is constantly supplied to the LAN adapter by an auxiliary power source, the LAN adapter asserts a WOL signal in response to the receipt through the LAN of a wake-up packet. Since a WOL status register and a logic circuit are provided for the expansion unit, network security is ensured for the information processing system. The information processing system can issue an instruction to permit or to inhibit a WOL by writing a predetermined value in the WOL status register. Upon receipt of a WOL signal from the LAN adapter, the logic circuit refers to the WOL status register. When a wake-up is permitted, the logic circuit issues a power-on operation to a notebook PC, and when a wake-up is inhibited, the logic circuit ignores the WOL signal and inhibits the WOL function.

4 Claims, 7 Drawing Sheets

EXPANSION UNIT FOR DIFFERENTIATING WAKE-UP PACKETS RECEIVED IN AN INFORMATION PROCESSING SYSTEM

BACKGROUND OF THE INVENTION

1. Field of the Invention

The present invention relates to an expansion unit on which an information processing system, such as a personal computer, is mounted to expand its functions and, in particular, to an expansion unit that provides a LAN connection environment for an information processing system. More specifically, the present invention pertains to an expansion unit that provides a WOL (Wake-up On LAN) function that ensures security (prevention from illegal access through a network) for an information processing system.

2. Prior Art

Recently, the term "network computing" is frequently appearing in a variety of media, such as newspapers and magazines.

"Network computing" as is literally defined, is an environment wherein a plurality of computers and peripheral devices are connected through a communication medium (either by wire or wireless). The "network" is a communication network for exchanging data between computers. The form of network varies from a local network, such as a LAN (Local Area Network), to a wide range network, such as a public switched telephone network (PSTN), and to the "Internet," which is a huge, global network as the result of the interconnection of servers. A computer system that serves as DTE (Data Terminal Equipment) is connected to a network through a DCE (Data Circuit Terminal Equipment). The DCE is a modem (Modulator/Demodulator) for an analog network, such as the PSTN, or a TA (Terminal Adapter) for an ISDN (Integrated Services Digital Network), or a LAN adapter (e.g., an ethernet card or a token ring card) for a LAN. The DTE is a dedicated terminal connected to the network through the DCE, or may be a general purpose computer system (e.g., IBM PC/AT compatible machine ["PC/AT" is a trademark of IBM Corp]).

A LAN is a network that is voluntarily managed by an independent association, such as a university or an institute, and is a minimum network unit covering only a relatively small area, such as an in-house area. As LANs have been supported by reductions in prices of communication devices and the enhancement of communication software, which have been accompanied by the developments of semiconductor techniques, LANs have come to be widely employed in the development and research environments for the sharing of computer resources and the sharing and distribution of information.

There are two forms of LANs: a peer-to-peer-based LAN and a client-server-based LAN. For a peer-to-peer-based LAN, The DTEs that are linked together are equals and can share their resources; a user at a specific DTE can use a disk or a printer owned by another LAN user. For a client-server-based LAN, one machine on the LAN serves as a dedicated server and is used in common by other LAN users (i.e., clients). In a client-server-based LAN, a server that provides a service and a client that receives the service perform synchronized processing by using a remote procedure call (RPC).

Lately, the client-server-based method, whereby general-purpose computers (PCs) are linked together, has become the main computing network system, partially because of the following advantages it offers.

(1) Since necessary software is installed for each client PC, individual users can perform their desired jobs.

(2) Data or files to be used in common are loaded in a server, and use of a printer connected to the server can be shared by the users on the network.

(3) Software, such as groupware, is installed in a server, and a process can be performed corresponding to that performed by a workgroup.

However, since information is excessively distributed on the client side (i.e., the sizes of the clients are too much increased), a problem has arisen in that on the client side an enormous amount of money is required for the maintenance and the management of the system. For example, each time the version of an OS or an application is upgraded, much time and effort must be expended for the installation and setup of each PC. A reduction in the general costs associated with a network; i.e., the total cost of ownership (TCO), is an urgent necessity.

To reduce the TCO, one idea is to centralize at the server the management of the software resources on the network. In this case, for example, only a program located at the server would have to be updated in order to automatically update programs used by the clients. By centralizing the management at the server, the occurrence of problems due the operating errors of clients can be prevented, and the management costs; i.e., the TCO, can be reduced.

A method by which to reduce the TCO involves the employment of a WOL; i.e., a "Wake-up ON LAN" to control the system configuration of clients through a network. At night, when an office is unoccupied, individual client systems on a network that are in the power-off state are automatically activated, so that new applications can be installed in the individual systems and old applications can be updated or replaced.

To implement the WOL, a DCE to be linked with a network; i.e., a LAN, must include the WOL function. When a DTE, a user's terminal, is a general-purpose computer, the DCE is provided in the form of a LAN adapter card. The adapter card can generally be plugged into one of the bus slots on a computer (motherboard). Implementation of the WOL function is accomplished by another function that automatically activates a computer system through a network; i.e., through the LAN.

As the employment of computer systems has spread, attention has come to be focused on the security problem. While various types of electronic apparatuses, such as notebook PCs, are now more compactly made and are light and more easily carried, as a side effect of those advantages, the apparatuses are more susceptible to theft and illegal use. To prevent physical theft, various locking mechanisms are provided for the apparatuses. A mechanism using a so-called "Kensington lock" is a typical example. The "Kensington lock" is disclosed in, for example, U.S. Pat. No. 5,381,685 (Japanese Patent Publication No. Hei 6-511297), but since the locking is not directly related to the present invention, no further explanation for it will be given.

The security problem with computer systems is not only at the physical level, but has been expanded and now also constitutes a software problem not recognized or addressed in the prior art, in that data are illegally copied or destroyed as the result of unauthorized system accesses. When the above described WOL function is employed, for example, an unauthorized skillful user could arbitrarily enter a client system by remote control during a time period in which an office is unoccupied, and use the computer system illegally. In other words, for security, a computer system incorporating the WOL function requires another function for limiting the automatic activation of the system through the LAN.

OBJECTS OF THE INVENTION

It is, therefore, one object of the present invention to provide a superior expansion unit that provides a LAN connection environment for an information processing system mounted thereon, and an information processing system to be mounted on such an expansion unit.

It is another object of the present invention to provide a superior expansion unit that provides a WOL (Wake-up On LAN) function that ensures the security (the protection from unauthorized access through a network) of an information processing system, and an information processing system to be mounted on such an expansion unit.

It is an additional object of the present invention to provide a superior expansion unit that implements a WOL security function for notebook PCs in a multi-user environment wherein one expansion unit is used in common by an unspecified number of notebook PCs, and an information processing system to be mounted on such an expansion unit.

It is a further object of the present invention to provide an expansion unit that implements a WOL security function at a low cost in a multi-user environment wherein one expansion unit is used in common by an unspecified number of notebook PCs, and an information processing system to be mounted on such an expansion unit.

SUMMARY OF THE INVENTION

To achieve the above objects, according to a first aspect of the present invention, an expansion unit for expanding the function of an information processing system mounted thereon, comprises: (a) a network adapter, connected to a network, for asserting a wake signal in response to the receipt of a wake-up packet through the network; (b) a wake status register for storing a status attesting to whether or not a wake-up through the network is permitted, the wake status register being accessible to the information processing system mounted on the expansion unit; (c) a logic circuit for, in response to the assertion of the wake signal, instructing that the information processing system be powered on when the wake-up through the network is permitted, and for ignoring the assertion of the wake signal when the wake-up through the network is inhibited; and (d) a power unit for providing constant power supply to the network adapter and the logic circuit.

A value indicating that the wake-up through the network is permitted may be set for the wake status register either when the information processing system is detached from the expansion unit, when the logic circuit is initialized, or when the information processing system accesses writing.

According to a second aspect of the present invention, an expansion unit for expanding the function of an information processing system mounted thereon, comprises: (a) a LAN adapter, being connected to a LAN, for asserting a WOL signal in response to the receipt of a wake-up packet through the LAN; (b) a WOL status register for storing a status attesting to whether or not a wake-up (WOL) through the LAN is permitted, the wake status register being I/O accessible by the information processing system mounted on the expansion unit; (c) a logic circuit for, in response to the assertion of the WOL signal, instructing that the information processing system be powered on if the WOL through the LAN is permitted, and for ignoring the assertion of the WOL signal if the WOL through the LAN is inhibited; and (d) a power unit for providing a constant power supply to the LAN adapter and the logic circuit.

A value indicating that the WOL through the LAN is permitted may be set for the WOL status register either when the information processing system is detached from the expansion unit, when the logic circuit is initialized, or when the information processing system performs I/O writing.

According to a third aspect of the present invention, the information processing system, which can be mounted on the expansion unit according to the first aspect, comprises: a nonvolatile, security status storage device for storing a network security level imposed on the system; and security operation sequence means for referring to the security status storage device in response to a power-on instruction from the expansion unit, and for performing a power-on sequence in accordance with the power-on instruction when the security level is released, or for ignoring the power-on instruction and halting the sequence if the security level is set.

According to a fourth aspect of the present invention, the information processing system, which can be mounted on the expansion unit according to the first aspect, comprises: a processor for executing a software program; a memory for temporarily storing program code or data currently processing; an external storage device; a user entry device; an output device for outputting processed data; a nonvolatile, security status storage device for storing a network security level imposed on the system; and security operation sequence means for referring to the security status storage device in response to a power-on instruction from the expansion unit, and for performing a power-on sequence according to the power-on instruction when the security level is released, or for ignoring the power-on instruction and halting the power-on sequence if the security level is set.

In the information processing system according to the third or the fourth aspect, when the power-on sequence is halted in response to when the security level in the security status storage device being set, the security operation sequence means may write, in the wake status register of the expansion unit, a value for inhibiting the wake-up.

According to a fifth aspect of the present invention, the information processing system, which can be mounted on the expansion unit according to the second aspect, comprises: a nonvolatile, security status storage device for storing a WOL security level imposed on the system; and security operation sequence means for referring to the security status storage device in response to a power-on instruction from the expansion unit, and for performing a power-on sequence in accordance with the power-on instruction when the security level is released, or for ignoring the power-on instruction and halting the power-on sequence if the security level is set.

According to a sixth aspect of the present invention, the information processing system, which can be mounted on the expansion unit according to the second aspect, comprises: a processor for executing a software program; a memory for temporarily storing program code or data currently processing; an external storage device; a user entry device; an output device for outputting processed data; a nonvolatile, security status storage device for storing a WOL security level imposed on the system; and security operation sequence means for referring to the security status storage device in response to a power-on instruction from the expansion unit, and for performing a power-on sequence according to the power-on instruction when the security level is released, or for ignoring the power-on instruction and halting the power-on sequence if the security level is set.

In the information processing system according to the fifth or the sixth aspect, when the power-on sequence is halted in response to when the security level in the security status storage device being set, the security operation sequence means may perform an I/O access to the WOL status register of the expansion unit, to write a value for inhibiting the wake-up.

According to a seventh aspect of the present invention, provided is a method for controlling the information processing system that can be mounted on the expansion unit according to the first aspect and that includes a nonvolatile, security status storage device for storing a network security level imposed on the system, the method comprising the steps of: (a) referring to the security status storage device in response to a power-on instruction from the expansion unit while the power supply is halted; (b) performing a power-on sequence in accordance with the power-on instruction when the security level is released; and (c) ignoring the power-on instruction and halting the power-on sequence when the security level is set.

When step (c) is performed, a step (d) at which the security operation sequence means writes, in the wake status register of the expansion unit, a value for inhibiting a wake-up.

According to an eighth aspect of the present invention, provided is a method for controlling the information processing system that can be mounted on the expansion unit according to the second aspect and that includes a nonvolatile, security status storage device for storing a WOL security level imposed on the system, the method comprising the steps of: (a) referring to the security status storage device in response to a power-on instruction from the expansion unit while the power supply is halted; (b) performing a power-on sequence in accordance with the power-on instruction when the security level is released; and (c) ignoring the power-on instruction and halting the power-on sequence when the security level is set.

When step (c) is performed, a step (d) at which the security operation sequence means performs an I/O access to the WOL status register of the expansion unit, to write a value for inhibiting a wake-up.

According to a ninth aspect of the present invention, an expansion unit, which provides a network connection function for an external computer system comprises: (a) a connecter for an electrical connection with the external computer system; (b) a network adapter connected to the network, for asserting a wake signal in response to a wake-up packet received from the network, the network adapter having an automatic activation function effected through the network; (c) a logic circuit for issuing a power-on instruction to the external computer system in response to the assertion of the wake signal; and (d) masking means for, in accordance with a setup by the external computer system, masking an operation performed in response to the wake signal issued by the logic circuit.

According to the tenth aspect of the present invention, an expansion unit, which provides a LAN connection function for an external computer system, comprises: (a) a connecter for an electrical connection with the external computer system; (b) a LAN, adapter, connected to the LAN, for asserting a WOL signal in response to a wake-up packet received from the LAN, the LAN adapter having a WOL function; (c) a logic circuit for issuing a power-on instruction to the external computer system in response to the assertion of the WOL signal; and (d) masking means for, in accordance with a setup by the external computer system, masking an operation performed in response to the WOL signal issued by the logic circuit.

Other objects, features and advantages of the present invention will become apparent during the course of the following detailed description of the preferred embodiment, given while referring to the accompanying drawings.

DESCRIPTION OF THE PREFERRED EMBODIMENT

Figure 6:
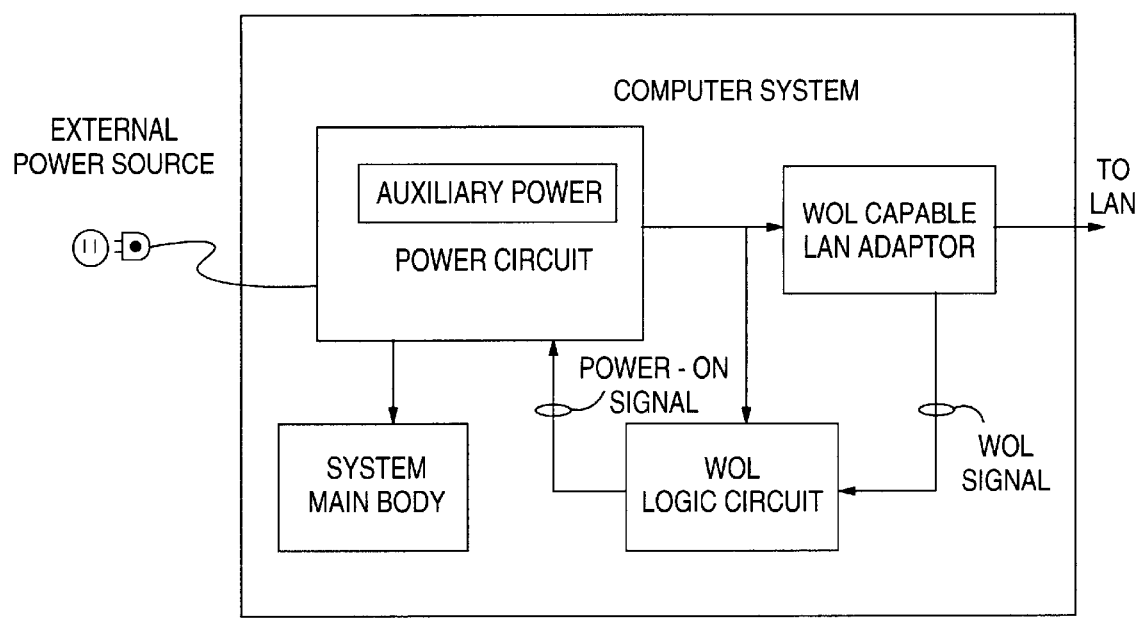
FIG. 6 is a specific diagram illustrating a WOL compatible computer system.

FIG. 6 is a specific diagram showing the arrangement of a WOL compatible computer system. A WOL capable LAN adapter is connected to the LAN, and asserts a WOL signal to the system when a frame packet is detected that instructs the activation of the system in the OFF state, i.e. instructing a "wake-up" (hereinafter referred to as a wake-up packet"). Further, the WOL compatible computer system is equipped with an auxiliary power source that provides a continuous power supply to the LAN adapter, and thus the WOL operation can be performed even when the system is powered off. The computer system also includes a WOL logical circuit that detects a WOL signal asserted by the WOL capable LAN adapter, and in response to this signal, instructs the powering on the entire system.

Figure 7:
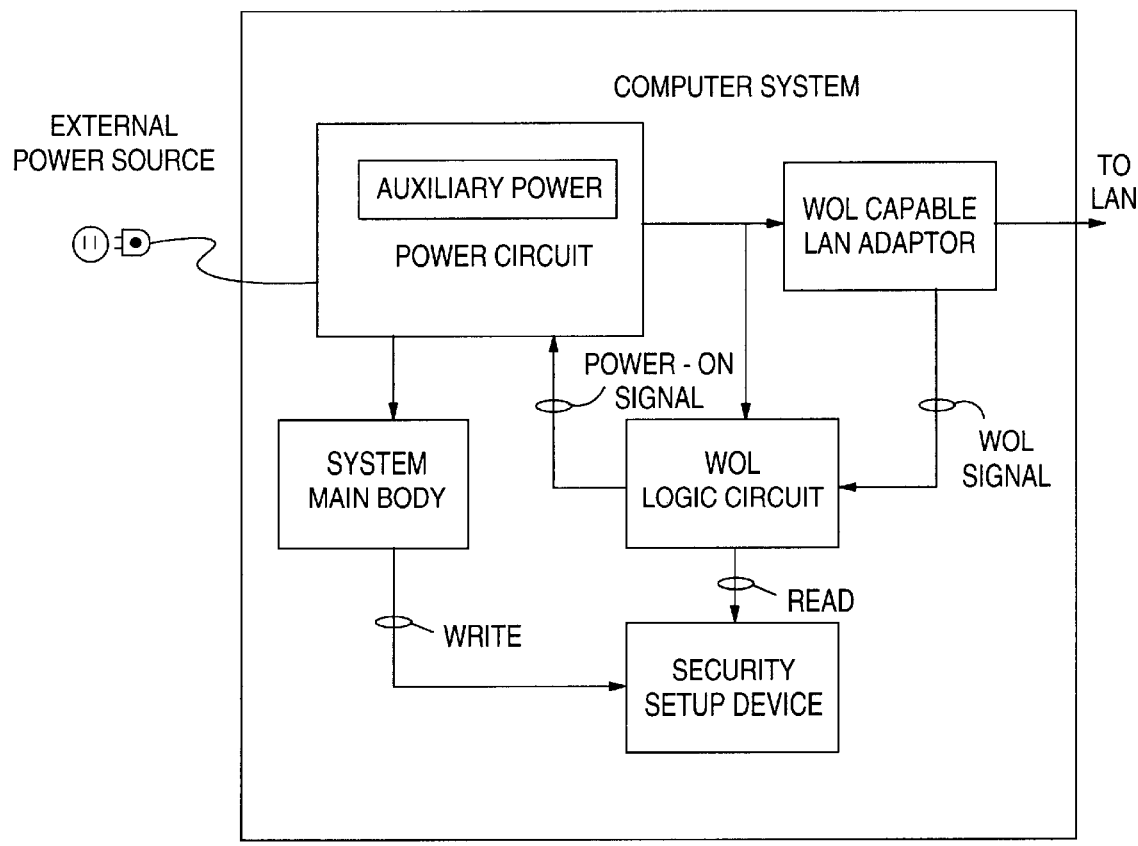
FIG. 7 is a schematic diagram showing an example computer system having a WOL function that is designed while taking security into consideration.

FIG. 7 is a schematic diagram illustrating an example arrangement of a computer system incorporating a WOL function that was designed while taking the security into consideration. As is shown in FIG. 7, a security setup device for setting a security level is provided for the computer system. It is preferable that the security setup device maintain the security setup level even when the power to the computers is off, and that a nonvolatile memory, such as a CMOS RAM or an NVRAM in the computer system, be employed. When the CPU of the system writes a predetermined value to the security setup device, a desired security level is set. The simplest example setup of the security level consists of a "security ON" that instructs the rejection of a WOL signal from the WOL capable LAN card, and "security OFF" that instructs the acceptance of a WOL signal. Upon receipt of a WOL signal, a WOL logical circuit refers to the setting for the security setup device. When the setup is for the security-ON state, the WOL logical circuit ignores (masks) the WOL assert signal and inhibits the power supply to the computer system. When the setup is for the security-OFF state, the WOL logical circuit accepts the WOL assert signal and permits the power supply to the computer system. In other words, in this case, the WOL logical circuit serves as a WOL function masking circuit that interacts with the security setup device.

If a LAN card for implementing the WOL function is identical to a computer system for setting the security level under the WOL operation, the problem on the security for the WOL function can be easily resolved by the method shown in FIG. 7. For a desktop PC, for example, the WOL function is achieved by inserting a WOL capable LAN adapter card into a bus slot on the computer's main body (motherboard). In this case, the subject that uses the computer is identical to the subject that uses the LAN adapter, and the policy and the strategy for security are not competitive. In other words, if a user of the computer sets the security level for the WOL function of the LAN adapter, the security level reflects the user's intent, and for the user is not inconvenient.

As the variety of recent computer associated products and their usage environments has increased, the subject that employs a computer system is not always identical to the subject that employs a LAN adapter. An occasion where a notebook PC is connected to a network through an expansion unit corresponds to the above case.

Figure 8:
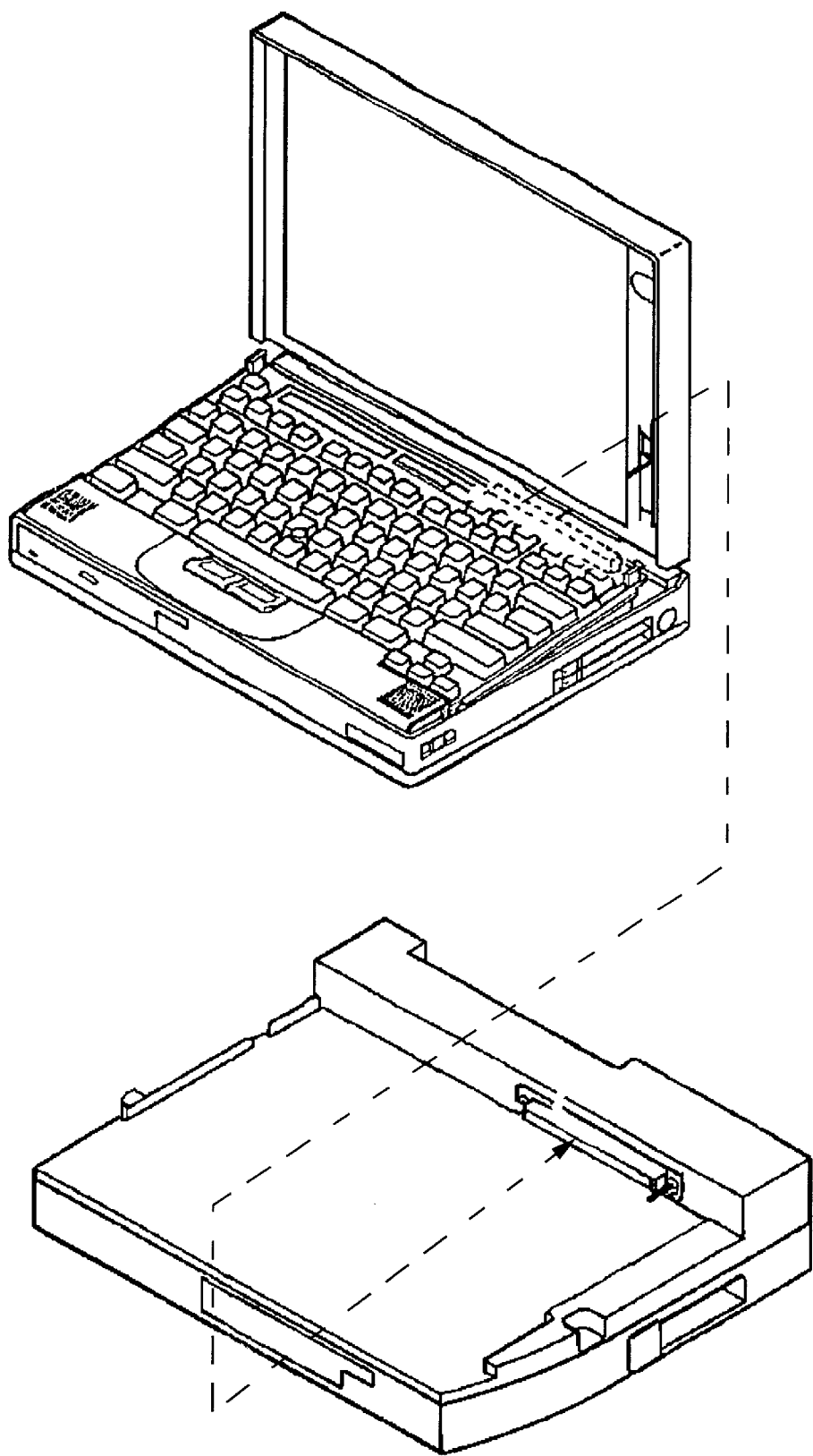
FIG. 8 is a diagram illustrating the state where a notebook PC is to be mounted on an expansion unit.

An expansion unit is a device on which a notebook PC need only be mounted to expand its peripheral environment. In FIG. 8 is shown the situation where a notebook PC is mounted on an expansion unit. While the notebook PC is designed to be compact and light to ensure portability, the ability to expand its peripheral environment is sacrificed. For example, the number of external storage devices that can be retained in the notebook PC is considerably limited, a bus card slot for an adapter card is not provided, and only the inserting of a PC card is permitted. Connection cables for various devices, such as a printer, a CRT (Cathode Ray Tube) display and an external keyboard, that are used in the office must be attached of detached from the PC each time the PC is carried out, and this is a very inconvenient. The expansion unit, however, provides the same work environment as that of a desktop PC for the notebook PC when it is used in the office, and includes a "port replication function" and a "bus expansion function."

The port replication function is implemented by extending a connection port signal line of the notebook PC. When peripheral devices, such as a printer, a CRT display and an external keyboard, are connected in advance to the expansion unit by a cable, a user can use them immediately merely be mounting the notebook PC on the expansion unit. In addition, when the peripheral devices are constantly connected to the expansion unit, they can be immediately employed when another notebook PC is mounted, and a user can be relieved of the task of detaching the cables. The port replication function is sometimes called a "cable management function," from the standpoint of the general management of cable connections.

The bus expansion function is implemented by extending, into the expansion unit, buses in the notebook PC, e.g., a PCI (Peripheral Component Interconnect) bus that serves as a local bus and an ISA (Industry Standard Architecture) bus that serves as a system bus. The expansion unit includes a space used to store an external storage device connected to the bus, and a bus slot used for inserting an adapter card. When an HDD or SCSI (Small Computer System Interface) adapter card or a LAN adapter card is attached to the expansion unit, a file sub-system or a network sub-system can be provided for the user of a notebook PC. The expansion unit is sometimes called a "docking station". An expansion unit having only the port replication function may be called a "port replicator".

In use, expansion units are classified as being "single-user mode" and "multi-user mode" devices. In the single-user mode, only one PC user is authorized to employ an expansion unit, and the mounting of only one specific notebook PC on the expansion unit is permitted. Whereas for the multi-user mode, the expansion unit is shared by a plurality of PCusers, and the notebook PCs of these users may be exchangeably mounted on the expansion unit. In the multi-user mode, differences of the policies and the strategies employed by the users tend to exist. Expansion units are disclosed, for example, in Japanese Patent Applications No. Hei 5-181593 (Japanese Unexamined Patent Publication No. Hei 7-36577: Our docket No.: JA9-93-027) and No. Hei 6-134124 (Japanese Unexamined Patent Publication No. Hei 8-6668: Our docket No.: JA9-94-030), both of which were assigned to the present inventor.

The security provided during the WOL operation will be explained again. When, for example, a notebook PC is linked to a network by inserting a LAN adapter PC card into a PC card slot, it is assumed that the owner of the PC card is identical to the owner of the notebook PC, so that no conflict arises in the policies and the strategies imposed for the security of the LAN. When the notebook PC is connected to a network by mounting it on an expansion unit that includes a LAN adapter, the owner of the PC is not always identical to the owner of the LAN adapter, and conflicts will arise among owners because of the policies and the strategies imposed for the security of the LAN.

As is previously described, in order to ensure security for a WOL, required are a storage device for maintaining the WOL security levels and a masking device for masking a WOL signal according to the setup. When the devices for providing WOL security are mounted on an expansion unit, the security setup is uniformly decided by the expansion unit, even though the device subject of the security is a notebook PC. An expansion unit in a multi-user environment, for example, will cause conflicts among the users because of the policies and the strategies imposed for security. When priority is given to TCO reduction by using the WOL function, and when the WOL security level is not set for the expansion unit, the user of a notebook PC runs the risk of his or her system being exposed to unauthorized access, even when the power to the PC is off. On the other hand, when priority is given to security and when the WOL security is set for the expansion unit, even though a notebook PC has the WOL function, its user cannot receive a benefit of the WOL function such that the management of the system can be controlled at the servers across the network.

When the devices for implementing the WOL security operation, i.e., the storage device and the masking device described above, are mounted in a notebook PC, the security level can be set at the notebook PC that is the subject for the security, and each user can individually satisfy his or her desires as they relate to security. However, in this case, additional circuits, i.e., the storage device and the masking device, are mounted in notebook PCs for which the WOL function is not intended to be used, and this runs counter to the object of reducing the TCO. It seems odd that notebook PC not having a LAN adapter comprises a circuit for the WOL security as standard.

The preferred embodiment of the present invention will now be described in detail while referring to the accompanying drawings.

A. Hardware Arrangement of a Computer System

Figure 1:
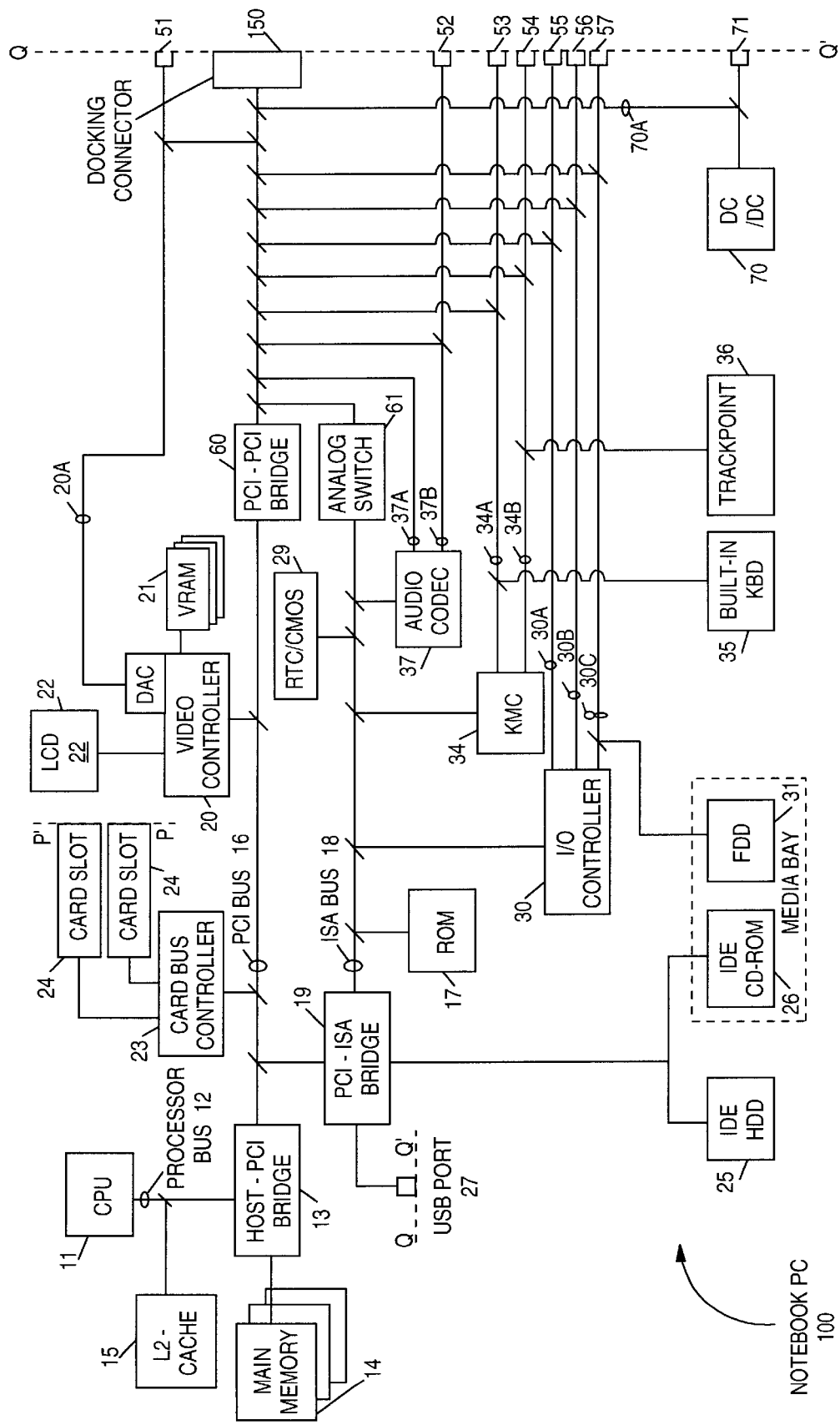
FIG. 1 is a schematic diagram illustrating the hardware arrangement of a personal computer (PC) 100 according to one embodiment of the present invention.

FIG. 1 is a schematic diagram illustrating the hardware arrangement of a personal computer (PC) 100 according to the present invention. The PC 100, a notebook PC, conforms to the OADG (PC Open Architecture Developer's Group) specifications, and either "Windows 95" of Microsoft Corp. Or "OS/2" of IBM Corp. is mounted as an operating system (OS). A docking connecter 150 is provided in the rear surface of the notebook PC 100 for an electrical connection with an expansion unit 200, which will be described later. The individual sections will now be described.

A CPU 11, a main controller, executes various programs under the control of the OS. The CPU 11 is, for example, a CPU "Pentium" chip or an "MMX technology Pentium" chip, each of which is produced by Intel Corp.

The CPU 11 is connected to hardware components, described later, via a processor bus 12, connected to its external pins; a PCI (Peripheral Component Interconnect) bus 16, acting as a local bus; and an ISA bus (Industry Standard Architecture) bus 18, acting as a system bus.

The processor bus 12 and the PCI bus 16 communicate with each other across a bridge circuit (a host-PCI bridge circuit) 13. The bridge circuit 13 in this embodiment includes a memory controller for controlling an operation for accessing a main memory 14, and a data buffer for absorbing a data transfer speed difference between the buses 12 and 16.

The main memory 14 is volatile memory and is used as a writing area for an executing program of the CPU 11, or as a work area for the program. Generally, the main memory 14 consists of a plurality of DRAM (Dynamic RAM) chips. A memory capacity of, for example, 32 MB is provided as a standard and can be expanded to 256 MB. The programs to be executed include device drivers that access an OS such as Windows 95 and peripheral devices, application programs for specified jobs, and firmware stored in a ROM17 (which will be described later).

An L2-cache 15 is a high-speed memory for absorbing the time required by the CPU 11 to access the main memory 14. A very limited amount of code and data that the CPU frequently accesses are temporarily stored in the L2-cache 15. Generally, the L2-cache 15 consists of SRAM (Static RAM) chips, and its memory capacity is, for example, 512 KB.

The PCI bus 16 is a bus for a relatively fast data transfer (a bus width of 32/64 bits, a maximum operating frequency of 33/66 MHZ and a maximum data transfer speed of 132/264 Mbps). PCI devices, such as a vide controller 20 and a card bus controller 23, that are operated at relatively high speeds are connected to the PCI bus 16. The PCI architecture was originated and advocated by Intel Corp., and implements a so-called PnP (Plug-and-Play) function.

The video controller 20 is a dedicated controller for the actual processing of graphics commands received from the CPU 11. The processed graphics information is temporarily written in a screen buffer (VRAM) 21, an is then read from the VRAM 21 and output as graphics data to a liquid crystal display (LCD) 22. The video controller 20 converts a video signal into an analog signal by using a digital-analog converter (DAC) attached thereto. An analog video signal is output across a signal line 20a to a CRT port 51. The signal line 20a branches en route and is also extended to the docking connector 150.

The card bus controller 23 is a dedicated controller for directly transmitting a bus signal on the PCI bus 16 to the interface connector (card bus) of a PCI card slot 24. The card slot 24 is formed, for example, in the wall P-P' (the left side surface in FIG. 8) of the computer 100, for inserting a PC card (not shown), which conforms to the specifications (e.g., "PC Card Standard 95") determined by the PCMCIA (Personal Computer Memory Card International Association)/JEIDA (Japan Electronic Industry Development Association).

A bridge circuit (PCI-PCI bridge) 60 is provided at the end of the PCI bus 16. The bridge circuit 60 interconnects with a secondary PCI bus downstream of the PCI bus (the primary PCI bus) 16. The secondary PCI bus is mounted in the expansion unit 200 that is connected through the docking connector 150. When the PCI bus is not connected downstream, the bridge circuit 60 disables the PCI bus signals at the end of the PCI bus 16.

The PCI bus 16 and the ISA bus 18 are mutually connected by a bridge circuit (PCI-ISA bridge) 19. The bridge circuit 19 in this embodiment includes a DMA controller, a programmable interrupt controller (PIC) and a programmable interval timer (PIT). The DMA controller is a dedicated controller for performing a data transfer between a peripheral device (e.g., an FDD) and the main memory 14 that does not pass through the CPU 11. The PIC is a dedicated controller for executing a program (an interrupt handler) in response to an interrupt request (IRQ) from each peripheral device. The PIT is a device for generating a timer signal at a predetermined cycle. The cycle for the timer signal generated by the PIT is programmable.

The bridge circuit 19 in this embodiment also includes an IDE (Integrated Drive Electronics) interface for connecting external storage devices that conform to the IDE specifications. An IDE hard disk drive (HDD) 25 is connected to the IDE interface, and an IDE CD-ROM drive 26 is also connected with an ATAPI (AT Attachment Packet Interface). Another type of IDE device, such as a DVD (Digital Video Disc or Digital Versatile Disc) drive, may be connected instead of the IDE CD-ROM drive 26. These external storage devices, such as the HDD 25 and the CD-ROM drive 26, are stored in the storage space called a "media bay" or a "device bay" in the PC 100. These external storage devices that are provided as standard may be mounted exchangeably with another device, such as an FDD or a battery pack and exclusively.

The bridge circuit 19 in this embodiment has a USB route controller for connecting a USB (Universal Serial Bus), a general purpose bus, and a USB port-27. The USB port 27 is formed, for example, in the wall Q-Q' of the computer 100. The USB supports a hot plugging function for inserting and removing an additional peripheral device (a USB device) while the system 100 is powered on, and a plug-and-play function for automatically identifying a newly connected peripheral device and for re-configuring a system configuration. A maximum 63 USB devices can be connected to a single USB port in a daisy chain manner. An example USB device is a keyboard, a mouse, a joystick, a scanner, a printer, a modem, a display monitor or a tablet.

The ISA bus 18 is a bus along which the data transfer speed is lower (a bus width of 16 bits and a maximum data transfer speed of 4 Mbps) than it is for the PCI bus 16. The ISA bus 18 is used to connect peripheral devices, such as a ROM 17, a real time clock (RTC) 29, an I/O controller 30, a keyboard/mouse controller (KMC) 34 and an audio CODEC 37, that are driven at a relatively low speed.

The ROM 17 is a nonvolatile memory for the permanent storage of a code group (BIOS: Basic Input/Output System) for the input and output signals for the hardware components, such as a keyboard 35 and the floppy disk drive (FDD) 31, and firmware such as a test program (POST: Power on Self Test) that is run when the system 100 is first powered on.

The real time clock (RTC) 29 is a device for measuring the current time. Generally, the RTC 29 and a CMOS memory are mounted together on a single chip. The CMOS memory is used to store information, such as a system configuration information (BIOS setup values) and a power ON password, that is required for the security/safety of the system 100. The RTC/CMMOS 29 is backed up by a reserve battery (ordinarily a coin battery: not shown) so that the contents obtained by measurement and the stored data are not lost when the system 100 is powered off. In this embodiment, information as to whether the system 100 permits or inhibits automatic activation through the network, i.e., a WOL (Wake-up On LAN) is also written to the RTC/CMOS 29.

The I/O controller 30 is a peripheral controller for driving the floppy disk drive (FDD) 31, and for controlling the input/output of parallel data (PIO) through a parallel port 55 and the input/output of serial data (SIO) through a serial port 56. A printer, for example, is connected to the parallel port 55 and a modem is connected to the serial port 56. A parallel signal line 30a extended to the parallel port 55, is also branched and extended to the docking connector 150. A serial signal line 30b extended to the serial port 56, is also branched and extended to the docking connector 150. A signal line 30c for the FDD 31 extended to an external FDD port 57, is also branched and extended to the docking connector 150.

The keyboard/mouse controller (KMC) 34 is a peripheral controller for fetching, as computer data, scan code input by the keyboard 35, or coordinate values designated by the trackpoint 36. The trackpoint 36 is a pointing device like a stick embedded almost in the center of the keyboard unit, and is disclosed in detail, for example, in U.S. Pat. No. 5,521,596 or U.S. Pat. No. 5,579,033. A keyboard signal line 34a and a mouse signal line 34b extend respectively to an external keyboard port 53 and a mouse port 54, and also branch and extend to the docking connector 150.

The audio CODEC 37 is a dedicated controller for processing the input/output of an audio signal, and includes a CODEC (Coder-DEcoder, and A/D and D/A converter having a mixing function) for digital recording and the reproduction of audio signals. The audio CODEC 37 can process MIDI (Musical Instrument Digital Interface) data. A MIDI signal line 37a is allocated to one part of the docking connector 150. An audio signal line 37b extends to a line output terminal 52, and also branches and extends to the docking connector 150.

An analog switch 61 is used to connect and disconnect the end of the ISA bus 18 and the docking connector 150. When the secondary PCI bus (described later) is connected through the docking connector 150, the analog switch 61 attenuates the signal at the ends of the individual bus signal lines, and disconnects the ISA bus 18 from the docking connector 150. If the ISA bus 18 is extended through the docking connector 150, the analog switch 61 urges the ends of the individual bus signal lines forward to connect the ISA bus 18 to the docking connector 150.

A DC inlet 71 is a jack used to attach an AC adapter that transforms an external AC power source into a DC voltage. A DC/DC converter reduces and stabilizes an external DC voltage received through either the DC inlet 71 or the docking connector 150, and supplies the stable voltage to the individual sections of the system 100. When the power is supplied by the expansion unit 200, the power is carried via a power feed line 70a to the DC/DC converter 70.

As is shown in FIG. 1, the bus signal lines of the PCI bus 16 and the ISA bus 18, the port signal lines 20a, 30a, 30b, . . . , and the power feed line 70a are allocated to individual connector pins of the docking connector 150. The electrical and mechanical specifications for the docking connector 150 correspond to those for a docking connector 250 of the expansion unit 200. When the connector 150 and 250 are coupled together, the bus signals across the PCI bus 16 and the ISA bus 18 of the computer 100 and the port signals 20a, 30a, 30b, . . . are developed in the expansion unit 200.

The broken line Q-Q' in FIG. 1 represents the rear surface of the notebook PC 100. The notebook PC 100 is coupled with the expansion unit 200 by the docking connector 150 at the rear surface. As a result of the connections t the rear surface, the ports 51, 52 and 53, which are also formed in the rear surface, are covered by the case of the expansion unit 200 and cannot be used. It should be noted, however, that this constitutes no problem because the external devices are prepared by the previously described port replication function of the expansion unit 200.

Although many electric circuits other than those shown in FIG. 1 are required to construct the computer system 100, they are well known to one having ordinary skill in the art. As they are not directly related to the subject of the present invention, no explanation for them will be given. Further, it should be noted that to avoid making the drawings too complex, in FIG. 1 only one part of the connections between the hardware blocks is shown.

B. Hardware Arrangement of an Expansion Unit

Figure 2:
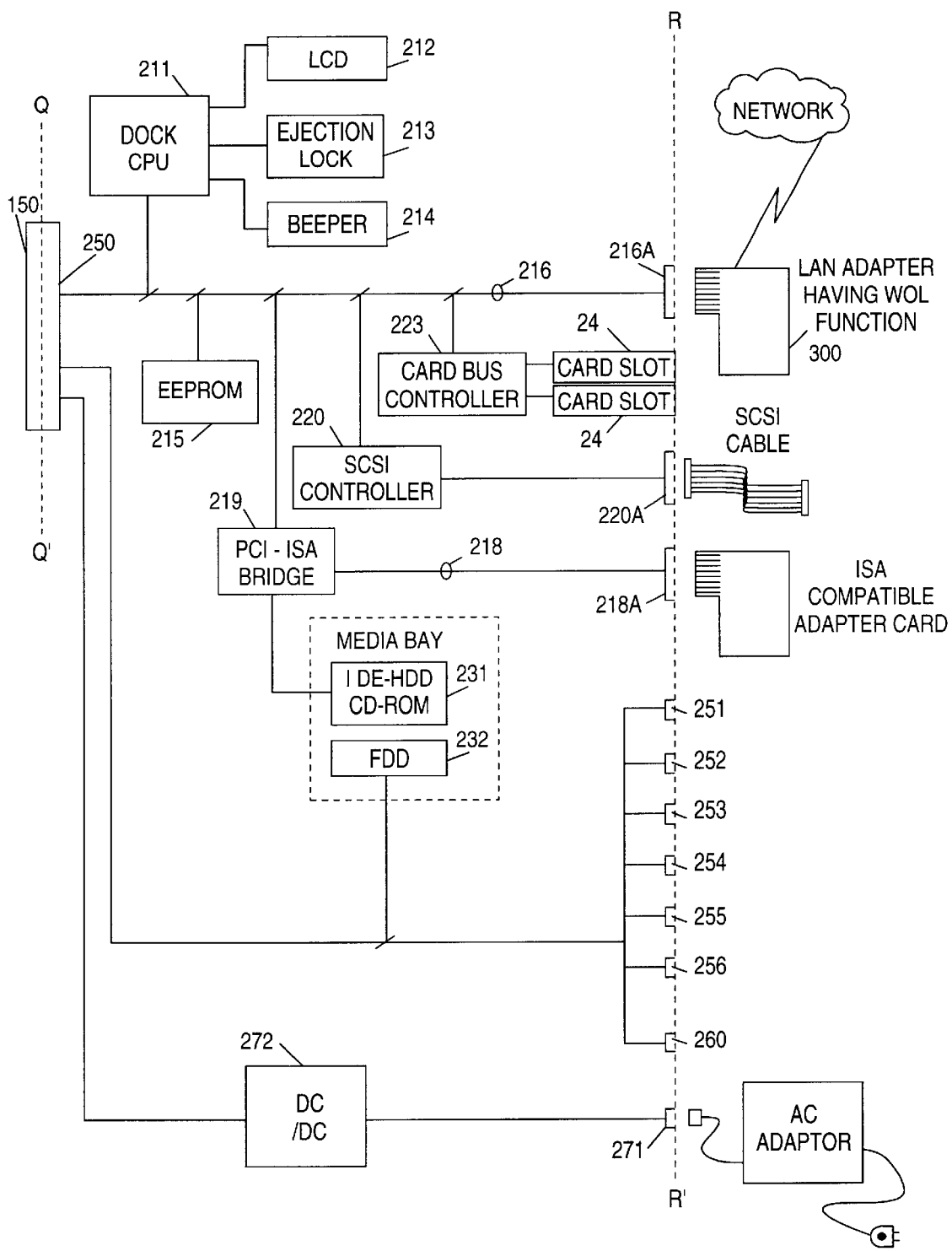
FIG. 2 is a schematic diagram illustrating the hardware arrangement of an expansion unit according to the embodiment of the present invention.

FIG. 2 is a schematic diagram illustrating the hardware arrangement of the expansion unit 200 according to the embodiment of the present invention. Since a LAN adapter card, which is a network sub-system, is plugged into the expansion unit 200, a user need only mount the notebook PC 100 on the expansion unit 200 to enter the LAN environment. The LAN adapter card in this embodiment has a WOL (Wake-up On LAN) function.

The expansion unit 200 has a docking connector 250, the electrical and mechanical specifications of which correspond to those for the connector 150 of the computer 100, and collectively receive bus signal and port signal through the connectors 150 and 250.

A CPU (Dock CPU) 211 of the expansion unit 200 is a main controller for controlling the individual sections of the unit 200. The Dock CPU 211 incorporates a RAM used as a work area and a ROM used to store code (firmware) for a program in progress (not shown). The Dock CPU 211 also controls and LCD indicator 212, for displaying the status of the unit 200; and eject lock 213, for mechanically inhibiting the removal of the computer 100; and a beeper 214, for generating an audible operation alarm.

For the system 100 (i.e., the CPU 11), the Dock CPU 211 is one peripheral device connected through the bus and incorporates an I/O accessible register. One part of the I/O register is used as a WOL status register, which will be described later. Power is supplied to the Dock CPU 11 by an auxiliary power source, even when the computer 100 and the expansion unit 200 are in the power-off state.

An EEPROM 215, a nonvolatile re-writable memory, is used to store the serial number of the expansion unit 200 as well as a small amount of data, such as a user password and system configuration information, that are required for security and system operating compensation when the computer 100 is connected to or disconnected from the expansion unit 200. The data stored in the EEPROM 215 can be referred to by both the Dock CPU 211 and the computer 100.

A DC/DC converter 272 reduces and stabilizes an external DC voltage received via the DC inlet 271, and distributes power to the expansion unit 200 and the computer 100. An AC adapter that transforms an AC voltage into a DC voltage is attached to the DC inlet 271. The DC/DC converter in this embodiment includes an auxiliary power source for providing a constant power supply to the Dock CPU 211 and a LAN adapter 300 during a period in which the expansion unit 200 and the computer 100 are in the off state (which will be described later).

The port signal lines collectively received through the docking connector 250 branch and extend to a CRT port 251, a line output terminal 252, an external keyboard port 253, an external mouse port 254, a parallel port 255, a serial port 256 and an MIDI port 260. An FDD 232 is connected to an FDD signal line.

Devices, such as a SCSI (Small Computer System Interface) controller 220 and a card bus controller 223, that require relatively fast data transfer are connected to a secondary PCI bus 216 that is extended into the expansion unit 200. The SCSI controller 220 is a dedicated controller for performing PCI-SCSI protocol conversion, and the SCSI bus is exposed at a SCSI port 220A outside the unit 200. External SCSI devices are connected to the SCSI port 220A in a daisy chain manner using a SCSI cable. Example SCSI devices are an HDD, an MO drive, a printer and a scanner.

The card bus controller 223, as well as the previously described card bus controller 23, is a dedicated controller for directly connecting a PCI bus signal line to a card slot 24.

One or more PCI bus slots 216A are prepared at the end of the secondary PCI bus 216. A PCI compatible expansion adapter card can be inserted into the PCI bus slot 216A. In this embodiment, at least the LAN adapter 300 having the WOL (Wake-up On LAN) function is inserted into the bus slot 216A. Example of Wake-up ON LAN function is set forth in U.S. Pat. No. 5,404,544 and others. Power is constantly supplied from the auxiliary power source to the LAN adapter 300, which receives a wake-up packet through the network and asserts a WOL signal. This operation will be described later in detail.

A secondary ISA bus 218 is provided for the expansion unit 200. The secondary ISA bus 218 is interconnected with the secondary PCI bus 216 by a bridge circuit (PCI-ISA bridge) 219. The secondary ISA bus 218 is provided to handle an overabundance of ISA legacy devices.

The arrangement of the bridge circuit 219 is almost the same as that of the previously described bridge circuit 19. The bridge circuit 219 includes an IDE interface to connect IDE devices 231, such as an HDD and a CD-ROM drive. The IDE devices 231 are stored with the FDD 232 in the "media bay" in the expansion unit 200 and can be exchanged.

One or more ISA bus slots 218A are prepared at the end of the secondary ISA bus 218. An ISA compatible expansion adapter card can be inserted into the ISA bus slot 218A.

The expansion unit 200 that extends the PCI bus is shown in FIG. 2, but this is not limited to the only one type of expansion unit that can be used. Another expansion unit that extends only the ISA bus, or, as an extreme example, an expansion unit type that expands only the LAN adapter card 300 having the WOL function may also be used.

C. Network Sub-system to Implement the WOL Function

Figure 3:
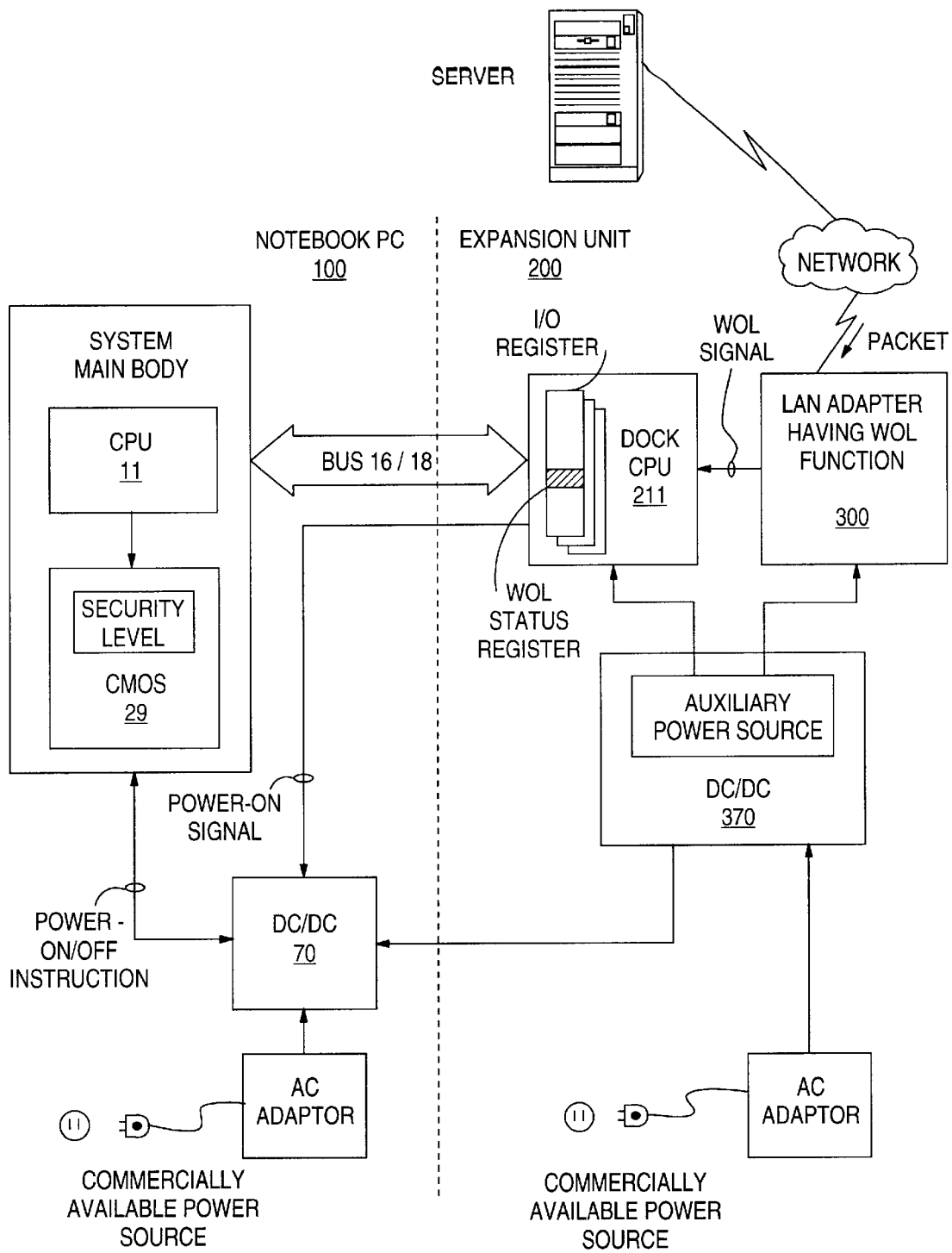
FIG. 3 is a diagram illustrating the system configuration while focusing on the WOL function.

FIG. 3 is a diagram illustrating the network sub-system arrangement with the WOL (Wake-up On LAN) function of the network sub-system being focused on.

The cooperative operation of the Dock CPU 211 and the LAN adapter 300 is required for the expansion unit 200 to ensure the security of the WOL function. The Dock CPU 211 and the LAN adapter 300 receive a constant power supply from the auxiliary power source in a DC/DC, converter 370, and can be operated even when the computer 100 and the expansion unit 200 are in the power-off state (previously described).

The LAN adapter 300 in this embodiment is provided as a PCI compatible adapter card for the expansion unit 200 (previously described). The LAN adapter 300 includes the WOL function, and outputs a WOL signal to the Dock CPU 211. When the LAN adapter 300 receives across the network a packet frame instructing the powering on of the expansion unit 200, i.e., a wake-up packet, the LAN adapter 300 asserts a WOL signal. It should be noted that a wake-up packet is issued, for example, by a server machine for managing an entire network.

The Dock CPU 211 is operated in accordance with the firmware stored in the incorporated ROM. For the system 100, the Dock CPU 211 acts as one of its peripheral devices that incorporates an I/O register accessible through the bus 16 or 18, and part of which is allocated as a WOL status register. Information as to whether an automatic activation in response to the WOL is permitted or inhibited by the system 100 is written in the WOL status register. The CPU 11 of the system 100 can permit or inhibit the WOL by writing a predetermined value in the WOL status register.

The Dock CPU 211 is operated in response to the assertion of the WOL signal. If a value held in the WOL status register indicates the WOL is permitted, a power-on instruction, i.e., a power-on signal, is asserted to the system 100. When a value in the WOL status register indicates the WOL is inhibited, the assertion of the WOL signal is ignored and no power-on signal is asserted to the system 100. In other words, one function of the WOL status register is the masking of a WOL signal.

In the computer 100, the security for the WOL function is provided when the CPU 11 executes the firmware stored in the ROM 17. An example firmware program is a POST (Power On Self Test; a self diagnosis program), an activation sequence executed by the system 100 when it is first powered on.

As was previously described, nonvolatile information required for the security and the safety of the system 100 is stored in the CMOS memory 29, and in this embodiment, also stored is information for the network security concerning whether automatic activation due to a WOL is permitted or inhibited. When, for example, "WOL enabled" is set by the execution of the system 100 of a predetermined utility program, code to that effect is written in the CMOS memory 29. When "WOL disabled (inhibited)" is set, code to that effect is written in the CMOS memory 29. The WOL enabled/disabled information is saved and referred to when the activation sequence is initiated (which will be described later).

The DC/DC converter 70 of the computer 100 may receive power either from an AC adapter attached to the computer 100, or from the DC/DC converter 370 of the expansion unit 200. In response to the manipulation of a power switch (not shown) of the computer 100, the DC/DC converter 70 initiates/halts the power supply to the system, and in response to the assertion of a power-on signal from the Dock CPU 211, it initiates the power supply to the system. The DC/DC converter 70 also halts the power supply in response to an instruction it receives from the CPU 11.

The performance of the WOL sequence (which will be described later) of the present invention does not depend on the LAN network topology. The LAN may be either an Ethernet or a Token Ring.

D. WOL sequence

The hardware arrangement for implementing the present invention has been described in the above sub-divisions. In this sub-division, a detailed explanation will be given for the sequence of the WOL function, which is accomplished through the cooperative processing performed by the computer 100 and the network sub-system of the expansion unit 200.

Figure 4:
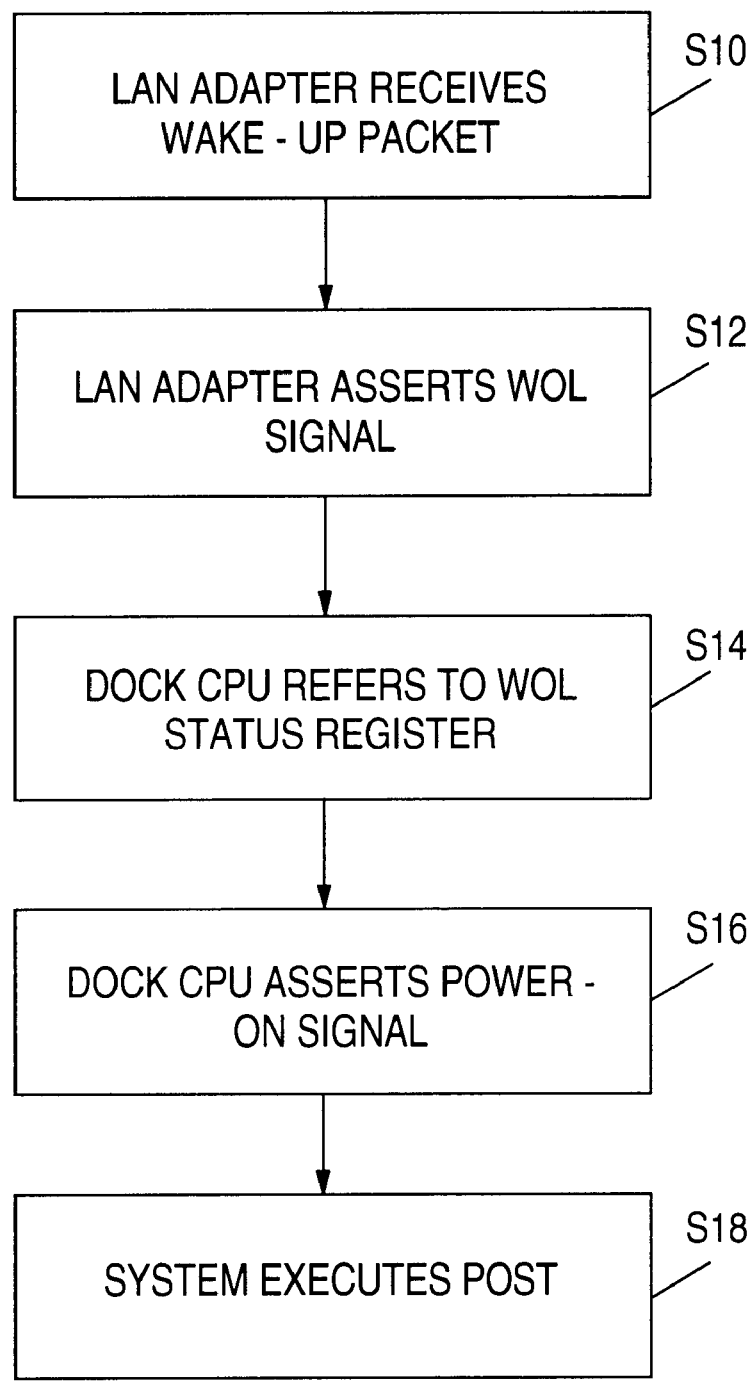
FIG. 4 is a flowchart showing a WOL sequence (when WOL is permitted) cooperatively performed by the computer 100 and the expansion unit 200.

FIG. 4 is a flowchart for the cooperative processing performed by the computer 100 and the expansion unit 200 when the WOL is permitted, i.e., when the WOL security level is not set for the computer 100. While the LAN adapter 300 and the Dock CPU 211 are set to the operation enabled state by the auxiliary power source, the other components are in the power-off state.

When the LAN adapter 300 receives a wake-up packet across the network (step s10), it asserts a WOL signal (step s12). A server machine for managing the entire network, for example, issues the wake-up packet across the network.

In response to the assertion of the WOL signal, the Dock CPU 211 refers to the contents of its WOL status register (step s14). Since the WOL is permitted, the Dock CPU 211 asserts the power-on signal (step s16).

In response to the assertion of the power-on signal, the computer 100 executes the POST program in the same manner as when it is powered on normally (step s18), and the system 100 is thus activated. The POST sequence includes the testing of the CPU 11 and the ROM 17, the setting of the memory 14, the setting and testing of the video controller 20, and the setting and testing of individual peripheral devices (well known). In this embodiment, during the performance of the POST sequence, the CMOS memory 29 is referred to for confirmation of the WOL security setup status. This process will be explained in detail later.

When the system 100 is on, a wake-up packet transmission source, i.e., a server, connected through the network can access the system 100, and can install or replace the programs, i.e., can manage the system configuration of the computer 100.

Figure 5:
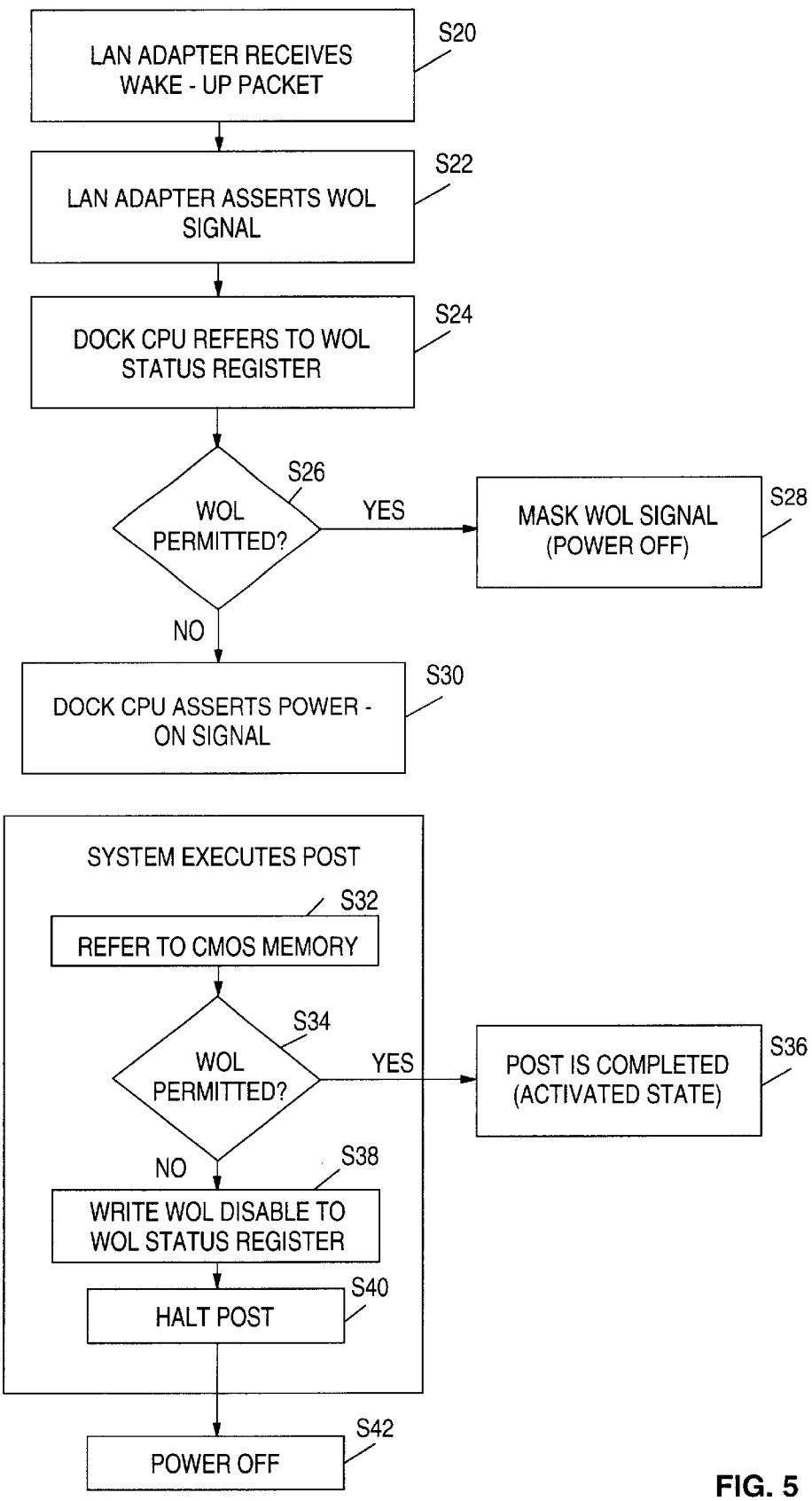
FIG. 5 is a flowchart showing a WOL sequence (when WOL is inhibited cooperatively performed by the computer 100 and the expansion unit 200.

FIG. 5 is a flowchart showing the cooperative processing performed by the computer 100 and the expansion unit 200 when the WOL is inhibited, i.e., when the WOL security level is set for the computer 100. While the LAN adapter 300 and the Dock CPU 211 are set to the operation enabled state by the auxiliary power source, other components are in the power-off state.

When the LAN adapter 300 receives a wake-up packet across the network (step s20), it asserts a WOL signal (step s22). A server machine for managing the entire network, for example, issues a wake-up packet across the network.

In response to the assertion of the WOL signal, the Dock CPU 211 refers to the contents of its WOL status register (step s24) to determine whether the WOL is permitted (step s26). When the contents of the WOL status register indicate that the WOL is inhibited, program control moves to step s28 whereat the Dock CPU 211 masks the WOL signal. Since a power-on instruction is not issued to the computer 100, the computer 100 is maintained in the power-off state. Therefore, the network server, which is the wake-up packet transmission source, cannot access the computer 100, and cannot manage the system configuration.

When the WOL permission is set in the WOL status register, the Dock CPU 211 asserts a power-on signal (step s30). Even if the computer 100 has already inhibited the WOL, i.e., even if the WOL inhibition is written in the CMOS memory 29, the WOL status register retains the WOL permission status that existed immediately after the expansion unit 200 was attached or after the Dock CPU 211 initialized the WOL status register, and the intent of the computer 100 is not yet reflected.

In response to the assertion of the power-on signal, the POST program is executed in the same manner as when the computer 100 is first powered on. During the performance of POST sequence, the CMOS memory 29 is referred to (step s32), and the security setup is confirmed (step s34). When WOL permission is designated, the POST sequence is completed, and the computer 100, which is then in the on state, is managed by the server, as is described while referring to FIG. 4. When WOL inhibition is designated in the CMOS memory 29, the CPU 11 performs an I/O write access of the WOL status register in the Dock CPU 211, and writes in the WOL inhibition information (step s38). The POST sequence is then halted (step s40), and the computer 100 is returned to the power-off state (step s42). As a result, the server on the network, which is the wake-up packet transmission source, cannot access the computer 100 and manage the system configuration.

When the WOL inhibition information is written to the WOL status register, the intent of the computer 100 to inhibit the WOL is reflected in the expansion unit 200. Even when the LAN adapter 300 thereafter receives a wake-up packet, the WOL signal is masked in the expansion unit 200. Thus, a power-on signal is not asserted in the computer 100, and the POST sequence need not be again performed. The WOL disabled status is maintained unless the computer 100 is detached from the expansion unit 200, the Dock CPU 211 is initialized, or the value held in the WOL status register is rewritten by an I/O write access performed by the computer 100 that is mounted.

In this embodiment, an explanation was given for an apparatus that is based on a so-called PC/AT compatible machine ("PC/AT" is a trademark of IBM Corp.) that conforms to the OADG specifications. However, the present invention can be applied in the same way by using another type of apparatus (e.g., an apparatus based on the NEC PC 98 series, the Macintosh from Apple Computer, Inc., or a machine that is compatible with either computer).

The present invention has been described in detail while referring to a specific embodiment. However, it should be obvious to one having ordinary skill in the art that various modifications or revisions of the embodiment are possible within the scope of the present invention.

Advantages of the Invention

As is described above, according to the present invention, provided is a superior expansion unit that provides a WOL (Wake-up On LAN) function that ensures the security (the protection from unauthorized access across a network) of an information processing system, and an information processing system to be mounted on such an expansion unit.

According to the present invention, provided is a superior expansion unit that implements a WOL security function for notebook PCs in a multi-user environment wherein one expansion unit is used in common by an unspecified number of notebook PCs, and an information processing system to be mounted on such an expansion unit.

According to the present invention, provided is an expansion unit that implements a WOL security function at a low cost in a multi-user environment wherein one expansion unit is used in common by an unspecified number of notebook PCs, and an information processing system to be mounted on such an expansion unit.

Operation

An information processing system expansion unit according to the present invention includes a network adapter (e.g., a LAN adapter) for connection to a network. The network adapter has an automatic activation function effected through the network (a so-called WOL (Wake-up On LAN) function). That is, since power is constantly supplied to the network adapter by a power circuit (e.g., an auxiliary power source), even when the expansion unit (and the information processing system mounted thereon) is in the power-off state, the network adapter asserts a wake signal (WOL signal) in response to the receipt through the network of a wake-up packet.

Since the wake status register (the WOL status register) and the logic circuit are provided for the expansion unit, network security is ensured for the information processing system. Power is also constantly supplied to the wake status register and the logic circuit by the power circuit, even in the period during which power to the expansion unit is off. The wake status register is, for example, one type of I/O register. The information processing system can issue an instruction to permit or to inhibit a wake-up through the network by writing a predetermined value in the register. Upon the receipt of a wake signal from the network adapter, the logic circuit refers to the wake status register. When a wake-up is permitted, the logic circuit issues a power-on instruction to the information processing system, and when a wake-up is inhibited, the logic circuit ignores (masks) the wake signal and inhibits the automatic activation through the network.

With the expansion unit of the present invention, the information processing system need only write, in the I/O wake status register, an instruction to permit or inhibit an automatic activation through the network (a so-called WOL). The expansion unit can provide a network security function for an unspecified number of information processing systems. The benefit of the network security can be provided for the information processing system simply by changing firmware, and the cost of such a change is not great.

When an information processing system is detached from an expansion unit, when the logic circuit is initialized, or when a mounted information processing system performs a write access, the wake status register need only be set to a value indicating that the wake-up through the network is permitted. This is because the status when the wake-up (i.e., the WOL) through the network is permitted is the default state of the network adapter, and because, if the WOL is inhibited when the information processing system is exchanged or when the logic circuit is initialized, the wake-up by the WOL cannot be initiated, and a mounted information processing system loses the opportunity to utilize the WOL function.

The information processing system according to the present invention can be mounted on the above described expansion unit, and comprises the security status storage device and the security operation sequence means. The security status storage device is a nonvolatile device, such as a CMOS RAM or NVRAM located in the system, for storing the network security level at which the system permits or inhibits a wake-up (i.e., a WOL) through the network. When the network security level is released, the security operation sequence means performs a power-on sequence (e.g., a POST) in accordance with a power-on instruction from the expansion unit, and achieves a wake-up through the network. When the network security level is set, the security operation sequence means ignores (masks) the power-on instruction from the expansion unit and halts the power-on sequence, and inhibits the wake-up through the network. The security operation sequence means may be a CPU that performs the sequence. The operation sequence is mounted in a system takes the form of firmware stored in a rom. Since the number of items required for the information processing system to implement the present invention is not large, the present invention does not run counter to the object of reducing the TCO.

When the power-on sequence is to be halted in accordance with the security level for the security status storage device being set, the security operation sequence means may write a value inhibiting a wake-up in the wake status register of the expansion unit. As a result, the WOL inhibition instruction from the information processing system is reflected in the expansion unit. When the network adapter (LAN adapter) of the expansion unit hereinafter receives a wake-up packet, the wake signal (WOL signal) is ignored (i.e., it is masked) in the expansion unit. The power-on instruction is not issued to the Information processing system, and the security operation sequence need not be performed again. The value held by the wake status register is not changed unless the information processing system is detached from the expansion unit, the logic circuit is initialized, or a WOL is permitted as a result of a write access of the mounted information processing system (previously described).

In summary, although the present invention has been disclosed by using an example, it should not be limited to that example. To fully understand the subject of the present invention, the claims should be referred to.

While the invention has been described in terms of preferred embodiments, those skilled in the art will recognize that the invention can be practiced with modification within the spirit and scope of the appended claims.

Having thus described our invention, what we claim is as follows:

1. An expansion unit for expanding the function of an information processing system when mounted thereon, comprising:

a communication network adapter for connecting the expansion unit to a communication network and for generating a wake up signal in response to the receipt of a wake-up packet via the network;

a wake up status register for storing a status indicating whether or not a wake-up through the network is permitted;

first means for setting the wake up status register to a state permitting wake up through the communication network when a mounted information processing system is disconnected from the expansion unit or when the mounted information unit performs an I/O operation or when the expansion unit is initialized;

second means responsive to a control signal provides by a mounted information processing system for setting the wake up status register to one of at least two states indicated by the control signal provided by the information processing system; and, logic circuit means responsive to the receipt of a wake up packet received via the communication network for generating a power on signal if the wake-up status register indicates that wake up through the network is permitted, and for ignoring the receipt of the wake up packet when the status indicates that wake-up through the network is inhibited.

2. An expansion unit as set forth in claim 1 having an information processing system mounted therein, said information processing system including:

a non-volatile storage means for storing at least two security codes; and means responsive to a power on signal from the expansion unit for examining the non-volatile storage means and for executing a power on operation when the non-volatile storage means stores a first code indicating no security and for disregarding the power-on signal when the non-volatile storage stores a second code indicating secure operation.

3. An expansion unit for expanding the function of an information processing system when mounted thereon, comprising:

a LAN adapter for connecting the expansion unit to a LAN and for generating a wake up signal in response to the receipt of a wake-up packet via the LAN;

a WOL status register for storing a status indicating whether or not a wake-up through the LAN is permitted;

first means for setting the WOL status register to a state permitting wake up through the LAN when a mounted information processing system is disconnected from the expansion unit or when a mounted information processing system performs an I/O operation or when the expansion unit is initialized;

second means responsive to a control signal provided by a mounted information processing system for setting the WOL status register to one of at least two states indicated by the control signal provided by the information processing system; and, logic circuit means responsive to the receipt of a wake up packet received via the LAN for generating a power on signal if the wake-up status register indicates that wake up through the LAN is permitted, and for ignoring the receipt of the wake up packet when the status indicates that wake-up through the LAN is inhibited.

4. An expansion unit as set forth in claim 3 having an information processing system mounted therein, said information processing system including:

a non-volatile storage means for storing at least two security codes; and means responsive to a power on signal from the expansion unit for examining the non-volatile storage means and for executing a power on operation when the non-volatile storage means stores a first code indicating no security and for disregarding the power-on signal when the non-volatile storage stores a second code indicating secure operation.

\* \* \* \* \*